United States Patent
Xu et al.

(10) Patent No.: US 11,644,601 B2
(45) Date of Patent: May 9, 2023

(54) ANTI-FOGGING FILM, ANTI-FOGGING COMPONENT, ADJUSTMENT METHOD THEREFOR, AND VEHICLE-MOUNTED DEVICE

(71) Applicants: CHENGDU BOE OPTOELECTRONICS TECHNOLOGY CO., LTD, Sichuan (CN); BOE TECHNOLOGY GROUP CO., LTD., Beijing (CN)

(72) Inventors: Yuanjie Xu, Beijing (CN); Weiyun Huang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 1055 days.

(21) Appl. No.: 16/322,748

(22) PCT Filed: Apr. 19, 2018

(86) PCT No.: PCT/CN2018/083739
§ 371 (c)(1),
(2) Date: Feb. 1, 2019

(87) PCT Pub. No.: WO2018/205813
PCT Pub. Date: Nov. 15, 2018

(65) Prior Publication Data
US 2021/0379865 A1  Dec. 9, 2021

(30) Foreign Application Priority Data
May 12, 2017 (CN) .......................... 201710334193.8

(51) Int. Cl.
*B32B 7/02* (2019.01)
*G02B 1/18* (2015.01)
(Continued)

(52) U.S. Cl.
CPC ................ *G02B 1/18* (2015.01); *B60J 1/002* (2013.01); *B60S 1/023* (2013.01); *B60S 1/026* (2013.01)

(58) Field of Classification Search
CPC .................................. B60S 1/023; B32B 7/02
See application file for complete search history.

(56) References Cited

U.S. PATENT DOCUMENTS

2016/0274352 A1* 9/2016 Wang .................. G02B 26/005
2018/0275327 A1* 9/2018 Inuduka ................ B05D 3/144
(Continued)

FOREIGN PATENT DOCUMENTS

| CN | 101029139 A | 9/2007 |
| CN | 101735697 A | 6/2010 |

(Continued)

OTHER PUBLICATIONS

Fan Xia, et al; "Dual-Responsive Surfaces That Switch between Superhydrophilicity and Superhydrophobicity", Adv. Mater. vol. 18, Issue 4, pp. 432-436, First published: Jan. 25, 2006.
(Continued)

*Primary Examiner* — Michael D Jennings

(57) ABSTRACT

An anti-fogging film, an anti-fogging component, an adjustment method therefor and a vehicle-mounted device, the anti-fogging film including: a conversion film layer and an excitation film layer, which is located on the conversion film layer; the conversion film layer carries out reversible conversion between a hydrophilic state and a hydrophobic state according to characteristic parameters of the excitation film layer.

14 Claims, 3 Drawing Sheets

(51) Int. Cl.
  *B60S 1/02* (2006.01)
  *B60J 1/00* (2006.01)

(56) References Cited

U.S. PATENT DOCUMENTS

| 2018/0373918 | A1 |  | 12/2018 | Wang |  |
|---|---|---|---|---|---|
| 2019/0024359 | A1 | * | 1/2019 | Hume | B32B 13/045 |
| 2019/0030855 | A1 | * | 1/2019 | Anantharamaiah | A41D 31/102 |
| 2019/0030876 | A1 | * | 1/2019 | Mazur | B32B 5/028 |
| 2021/0379865 | A1 | * | 12/2021 | Xu | B60J 1/002 |

FOREIGN PATENT DOCUMENTS

| CN | 103558685 | A | 2/2014 |
| CN | 104726834 | A | 6/2015 |
| CN | 106250849 | A | 12/2016 |
| CN | 106630677 | A | 5/2017 |
| CN | 107116855 | A | 9/2017 |
| TW | 200842350 | A | 11/2008 |
| TW | I350370 | B | 10/2011 |

OTHER PUBLICATIONS

"Electrochemically controlling polythiophene film to realize reversible conversion of wettability between superhydrophobicity and superhydrophilicity" author: Xu Ilan yi year of publish: Feb. 15, 2017.

Chunping Su, et al; "Photoinduced reversible wettability of a dendritic bismuth coating between superhydrophobicity and superhydrophilicity", *Publication Date and Name of Publication are not available.

Xinjian Feng, et al; "Reversible Super-hydrophobicity to Super-hydrophilicity Transition of Aligned ZnO Nanorod Films", J. Am. Chem. Soc. Published on the web Dec. 11, 2003, vol. 126, pp. 62-63.

Zhang jianshe; "Superhydrophobic surface preparation technology made important progress", Surface engineering consulting; published Feb. 2011.

International Search Report dated Jun. 14, 2018; PCT/CN2018/083739.

The First Chinese office action dated Jul. 19, 2018; Appln. No. 201710334193.8.

* cited by examiner

ANTI-FOGGING FILM, ANTI-FOGGING COMPONENT, ADJUSTMENT METHOD THEREFOR, AND VEHICLE-MOUNTED DEVICE

The present disclosure claims priority of China Patent application No. 201710334193.8 filed on May 12, 2017, the content of which is incorporated in its entirety as portion of the present disclosure by reference herein.

TECHNICAL FIELD

The present disclosure relates to an anti-fogging film, an anti-fogging device, an adjusting method thereof, and a vehicle-mounted device.

BACKGROUND

With the continuous development of science and technology, the needs of users are becoming more and more abundant. For example, in a case where it is a rain day or the outside air temperature is relatively low, the inside of a vehicle is hot, and the outside of the vehicle is cold, so a temperature difference between the inside and the outside of the vehicle is relatively large, thereby causing water vapor in the air inside the vehicle to be condensed into small water droplets 102 on an inner surface of a windshield 101, as illustrated by FIG. 1. Because gravity of the small water droplets 102 is small, and the adhesion force of the windshield 101 to the small water droplets 102 is large, so that the small water droplets 102 have the shape illustrated by FIG. 1, i.e., a contact area of the small water droplets 102 and the windshield 101 is increased, and frictional force of the small water droplets 102 is increased. In this way, a large number of small water droplets 102 are adsorbed to the windshield 101, causing fogging of the inner surface of the windshield 101, which seriously affects the driving sight of the driver inside the vehicle.

At present, the method for solving the abovementioned problem includes: blowing hot air to an inner side of the windshield or making the air inside the vehicle form convection, thereby reducing the temperature difference between the inside and the outside of the vehicle, and alleviating the fogging problem of the inner side of the windshield. However, the duration and lasting effect of the method are limited, and the method of blowing hot air will also result in waste of resources.

In summary, the fogging problem of the inner side of the windshield can only be alleviated in a short time by the existing methods.

SUMMARY

At least one embodiment of the present disclosure provides an anti-fogging film, including a conversion film and an excitation film on the conversion film. The conversion film is configured to perform a reversible conversion between a hydrophilic state and a hydrophobic state according to at least one characteristic parameter of the excitation film.

In at least one embodiment of the present disclosure, by utilizing the reversible conversion between a hydrophilic characteristic and a hydrophobic characteristic of the conversion film, i.e., exciting a contact angle between a surface of the conversion film and water (i.e., a static water contact angle) to convert from the hydrophilic state to the hydrophobic state according to at least one characteristic parameter of the excitation film, the adhesion force of water droplets on the conversion film is weakened to allow the water droplets on the conversion film easy to roll and accumulate into large water droplets, and then fall from the conversion film, so as to fundamentally ameliorate the fogging problem of the conversion film.

In the embodiments of the present disclosure, the reversible conversion between the hydrophilic characteristic and the hydrophobic characteristic of the conversion film includes: a static water contact angle of the conversion film is converted from a super-hydrophilic state (the contact angle between the surface of the conversion film and water is less than 5 degrees, for example, 0 degree) to a super-hydrophobic state (the contact angle between the surface of the conversion film and water is more than 150 degrees, for example, 165 degrees), so as to better weaken the adhesion force of water droplets on the conversion film.

In some examples, upon the at least one characteristic parameter of the excitation film satisfying a preset condition, the conversion film performs the reversible conversion between the hydrophilic state and the hydrophobic state.

In some examples, the at least one characteristic parameter of the excitation film includes: temperature, pH, light intensity, and electric field strength.

In the embodiments of the present disclosure, upon adjusting the at least one characteristic parameter of the excitation film to reach a preset conversion threshold, the excitation film excites a static water contact angle of the conversion film to convert from the hydrophilic state (or a super-hydrophilic state) to the hydrophobic state (or a super-hydrophobic state), such that the adhesion force of water droplets on the conversion film is weakened to allow the water droplets on the conversion film easy to roll and accumulate into large water droplets, and then fall from the conversion film, so as to fundamentally ameliorate the fogging problem of the conversion film.

In some examples, the excitation film includes one selected from the group consisting of a film comprising a substance of which pH changes after being energized, a film comprising a substance which emits light after being energized, and a film of which electric field strength changes after being energized.

In some examples, the conversion film is a polymer film which is responsive to at least one characteristic parameter of the excitation film.

In some examples, a material of the conversion film is a material which is responsive to the temperature of the excitation film, and the excitation film includes a heat transfer film.

In some examples, the excitation film further includes: a heat generation film on a side of the heat transfer film away from the conversion film.

In some examples, the conversion film is a polymer composite film which is double-responsive to the temperature and pH of the excitation film.

In some examples, the conversion film is a polytetrafluoro wax/fluorinated carbon nanotube composite film, a tin oxide nanorod array film, a film formed by a cellulose nano material, a film including a porous conductive polymer, or a composite film having a surface of dimeric pyrrole.

In some examples, the conversion film has a thickness in a range from 0.1 mm to 1 mm.

In some examples, films included in the anti-fogging film are transparent films.

In some examples, a side of the conversion film away from the excitation film includes a groove.

At least one embodiment of the present disclosure provides an anti-fogging device, including: the abovementioned anti-fogging film; and a control module, configured to adjust the at least one characteristic parameter of the excitation film according to a received message, so that the conversion film performs a reversible conversion between a hydrophilic state and a hydrophobic state.

In the embodiments of the present disclosure, upon adjusting the at least one characteristic parameter of the excitation film to reach a preset conversion threshold, the excitation film excites a static water contact angle of the conversion film to convert from the hydrophilic state (or a super-hydrophilic state) to the hydrophobic state (or a super-hydrophobic state), such that the adhesion force of water droplets on the conversion film is weakened to allow the water droplets on the conversion film easy to roll and accumulate into large water droplets, and fall from the conversion film, so as to fundamentally ameliorate the fogging problem of the conversion film.

In some examples, the control module being configured to adjust the at least one characteristic parameter of the excitation film according to the received message includes: sending an electrical signal to the excitation film such that the at least one characteristic parameter of the excitation film reaches a preset conversion threshold.

In some examples, the anti-fogging device further includes: at least two sensors, respectively configured to detect temperatures of spaces on two sides of a main plane of the anti-fogging film. The control module is further configured for: determining a detected temperature difference between the spaces on two sides of the main plane of the anti-fogging film; and if the temperature difference reaches a preset fogging threshold, sending an electrical signal to the excitation film, so that the at least one characteristic parameter of the excitation film reaches the preset conversion threshold, thereby exciting the conversion film to convert from the hydrophilic state to the hydrophobic state.

At least one embodiment of the present disclosure provides a vehicle-mounted device, including the abovementioned anti-fogging device.

At least one embodiment of the present disclosure provides an adjusting method of the anti-fogging device, including: judging whether the received message is a defogging command, the defogging command being a command to excite the conversion film to convert from the hydrophilic state to the hydrophobic state; adjusting the at least one characteristic parameter of the excitation film according to a judgment result, such that the conversion film performs a reversible conversion between the hydrophilic state and the hydrophobic state.

In the embodiments of the present disclosure, upon adjusting the at least one characteristic parameter of the excitation film to reach a preset conversion threshold, the excitation film excites a static water contact angle of the conversion film to convert from a hydrophilic state (or a super-hydrophilic state) to a hydrophobic state (or a super-hydrophobic state), such that the adhesion force of water droplets on the conversion film is weakened to allow the water droplets on the conversion film easy to roll and accumulate into large water droplets, and then fall from the conversion film, so as to fundamentally ameliorate the fogging problem of the conversion film.

In some examples, adjusting the at least one characteristic parameter of the excitation film according to the judgment result includes: if the received message is the defogging command, sending the excitation film an electrical signal configured to adjust the at least one characteristic parameter of the excitation film to a preset first threshold to excite the conversion film to convert from the hydrophilic state to the hydrophobic state.

In some examples, adjusting the at least one characteristic parameter of the excitation film according to the judgment result further includes: if the received message is not the defogging command, sending the excitation film an electrical signal configured to adjust the at least one characteristic parameter of the excitation film to a preset second threshold.

In some examples, if the received message is generated by a user, judging whether the received message is the defogging command according to a trigger identifier in the received message.

In some examples, the received message includes detected temperatures of the spaces on two sides of a main plane of the anti-fogging film. Judging whether the received message is a defogging command includes: determining a temperature difference between the spaces on two sides of the main plane of the anti-fogging film according to the temperatures of the spaces on two sides of the main plane of the anti-fogging film in the received message; and if the temperature difference reaches a preset fogging threshold, determining that the received message is the defogging command.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and in a case that the position of the object which is described is changed, the relative position relationship may be changed accordingly.

Figure 1:
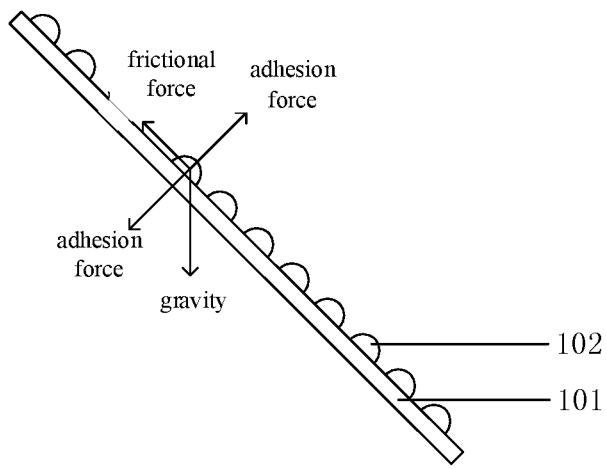
FIG. 1 is a schematic diagram of the force of small water droplets condensed on an inner surface of a windshield of a vehicle.
Figure 2A:
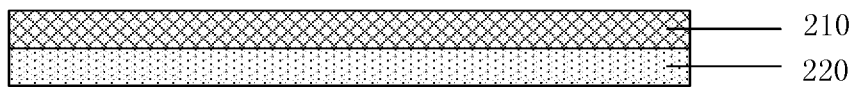
FIG. 2A is a schematic structural diagram of an anti-fogging film provided by an embodiment of the present disclosure.

As illustrated by FIG. 2A, an embodiment of the present disclosure provides an anti-fogging film, including: a conversion film 210 and an excitation film 220 on the conversion film 210. The conversion film 210 performs a reversible conversion between a hydrophilic state and a hydrophobic state according to at least one characteristic parameter of the excitation film 220, i.e., a surface of the conversion film 210 away from the excitation film 220 performs a reversible conversion between a hydrophilic state and a hydrophobic state. The abovementioned hydrophilic state refers to that a wetting angle (an angle between a tangent to a surface of a water droplet and a surface of the conversion film at the intersection of the conversion film, water and air) is not greater than 90°, and the hydrophobic state refers to that the wetting angle is greater than 90°. The wetting angle can also be referred to as a static water contact angle.

For example, the reversible conversion of the conversion film 210 between the hydrophilic state and the hydrophobic state according to a characteristic parameter of the excitation film 220 may include: the reversible conversion of the conversion film 210 between a super-hydrophilic state and a super-hydrophobic state. The super-hydrophilic state herein refers to a state that a wetting angle is smaller than 5°, for example 0°, and the super-hydrophobic state herein refers to a state that a wetting angle is greater than 150°, for example 165°.

For example, upon the characteristic parameter of the excitation film 220 satisfying a preset condition, the conversion film 210 performs the reversible conversion between the hydrophilic state and the hydrophobic state. The characteristic parameter of the excitation film 220 includes: at least one selected from the group consisting of temperature, light intensity, pH, and electric field strength.

The conversion film 210 provided in the present embodiment may be a film that is reversibly converted between a super-hydrophobic state and a super-hydrophilic state (i.e., the conversion film may perform a reversible conversion between a super-hydrophilic state and a super-hydrophobic state), and the excitation film 220 is a film determined by a responsive characteristic parameter of the conversion film 210. In other words, a forming material of the conversion film 210 corresponds to the characteristic parameter of the excitation film 220.

Figure 2B:
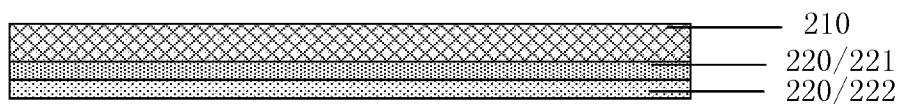
FIG. 2B is a schematic structural diagram of an anti-fogging film provided by an embodiment of the present disclosure.

For example, FIG. 2B is a schematic diagram of an anti-fogging film provided by an embodiment of the present disclosure. As illustrated by FIG. 2A and FIG. 2B, the conversion film 210 is a film which is responsive to temperature, i.e., temperature will cause the film to perform a reversible conversion between a hydrophilic state and a hydrophobic state, in this case, the excitation film 220 is a heat transfer film (as illustrated by FIG. 2A), or the excitation film 220 includes a heat generation film 222 and a heat transfer film 221 on the heat generation film 222 (as illustrated by FIG. 2B), that is, the excitation film 220 includes a heat generation film 222 and a heat transfer film 221 on a side of the heat generation film 222 facing the conversion film 210.

For example, the conversion film 210 can be a polytetrafluoro wax/fluorinated carbon nanotube composite film, which can adjust a surface chemical composition and microstructure of the conversion film 210 by sensing different temperatures, thereby achieving the reversible conversion from the super-hydrophilic state to the super-hydrophobic state of the conversion film 210.

For example, the conversion film 210 is a film which is responsive to temperature, and the higher the temperature, the higher hydrophobic characteristic the conversion film 210 has.

For example, the conversion film 210 illustrated by FIG. 2A may be a film which is responsive to light intensity, that is, the light intensity will cause the film to perform the reversible conversion between the hydrophilic state and the hydrophobic state, in this case, the excitation film 220 is a film including a substance which emits light after being energized. For example, the excitation film may include an electroluminescent material.

For example, the conversion film 210 may be a tin dioxide nanorod array film or a tin oxide nanorod array film having a dendritic bismuth coating layer on a surface thereof.

For example, because of the photocatalytic properties of bismuth, the dendritic bismuth coating layer coated on the surface of the tin dioxide nanorod array film will accelerate the conversion between the hydrophilic state and the hydrophobic state of the film. Under the environment of ultraviolet light irradiation, the conversion film 210 exhibits the hydrophobic state; in the absence of ultraviolet light irradiation, the conversion film 210 exhibits the hydrophilic state, thereby achieving the reversible conversion between the super-hydrophilic state and the super-hydrophobic state of the conversion film 210.

For example, the conversion film 210 illustrated by FIG. 2A may be a film which is responsive to pH, that is, pH will cause the reversible conversion between the hydrophilic state and the hydrophobic state of the film, in this case, the excitation film 220 is a film including a substance of which pH changes after being energized. For example, the excitation film may have a material of a sulfide, such as sulfur dioxide.

For example, in the environment where the excitation film 220 is acidic, the conversion film 210 exhibits the super-hydrophobic state; in an environment where the excitation film 220 is alkaline, the conversion film 210 exhibits the super-hydrophilic state, thereby achieving the reversible conversion between the super-hydrophilic state and the super-hydrophobic state of the conversion film 210.

For example, the conversion film 210 is a film which is responsive to electric field strength, that is, electric field strength will cause the reversible conversion between the hydrophilic state and the hydrophobic state of the film, in this case, the excitation film includes a film of which electric field strength changes after being energized. For example, the excitation film includes conductive films disposed at two opposite sides of the conversion film 210, so as to generate a uniform electric field, and the intensity of the electric field can be adjusted by controlling the voltage of the excitation film 220 (i.e., the excitation film located on opposite sides of the conversion film forms a capacitor, which can adjust the intensity of the electric filed in the capacitor by controlling the voltage of the excitation film, and the excitation film includes a conductive material), so as to further achieving the reversible conversion between the super-hydrophilic state and the super-hydrophobic state of the conversion film 210.

For example, the conversion film 210 may be a film formed by a cellulose nano material, or a film including a porous conductive polymer, or a composite film having a surface of dimeric pyrrole.

For example, the conversion film 210 is a polymer film which is responsive to at least one characteristic parameter of the excitation film 220.

For example, the conversion film 210 is a polymer composite film which is double-responsive to temperature and pH of the excitation film 220, that is, changes of temperature or pH will cause the reversible conversion between the hydrophilic state and the hydrophobic state of the film. The excitation film 220 is a film including a substance of which temperature or pH changes after being energized.

For example, upon the conversion film 210 being under the environment where the temperature is low and the pH is high, the intermolecular hydrogen bonds formed between the polymer molecules and the water molecules cause the conversion film 210 to exhibit a super-hydrophilic state, for example, the static water contact angle is 0 degree; upon the conversion film 210 being under the environment where the temperature is high, and the pH is low, the hydrogen bonds inside the polymer molecules cause the conversion film 210 to exhibit a super-hydrophobic state, for example, the static water contact angle is 165 degrees; and upon the conversion film 210 being under the environment of other conditions, such as a condition of high temperature and low pH, or a condition of low temperature and high pH, the static water contact angle of the conversion film 210 is between 0 and 165 degrees.

For example, the conversion film 210 provided by the present embodiment has a thickness in a range from 0.1 mm to 1 mm. For example, the conversion film 210 has a thickness greater than 0.5 mm and less than 0.8 mm.

For example, films included in the anti-fogging film provided by the present embodiment are transparent films, that is, both the conversion film and the excitation film are transparent films. Therefore, the anti-fogging film can be applied to a windshield of a vehicle or other fields.

Figure 3:
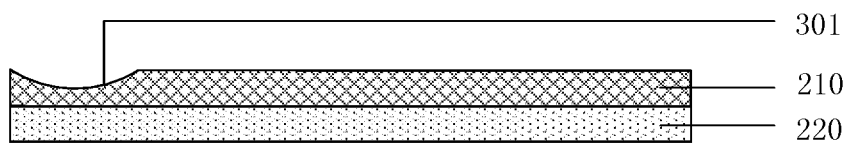
FIG. 3 is a schematic diagram of a groove of a conversion film provided by an embodiment of the present disclosure.

For example, FIG. 3 is a schematic diagram of a groove of a conversion film provided by an embodiment of the present disclosure. As illustrated by FIG. 3, the conversion film 210 includes a groove 301 configured to conduct water. The arrangement of the groove 301 is favorable for rapidly discharging the already accumulated water droplets along the grooves 301, so as to further reduce the adhesion of water droplets. For ease of understanding, FIG. 3 illustrates a case that the groove is located at a left-most side of the conversion film 210, but the present disclosure is not limited to the case illustrated in FIG. 3.

The excitation film in the anti-fogging film provided by the present disclosure can excite the static water contact angle of the surface of the conversion film to covert from 165° (a super-hydrophilic state) to 0° (a super-hydrophobic state), so that adhesion force of the water droplets adhered on the conversion film is weakened to allow the water droplets on the conversion film easy to roll and accumulate into large water droplets, and then fall from the conversion film, so as to fundamentally ameliorate the fogging problem of the conversion film.

Figure 4A:
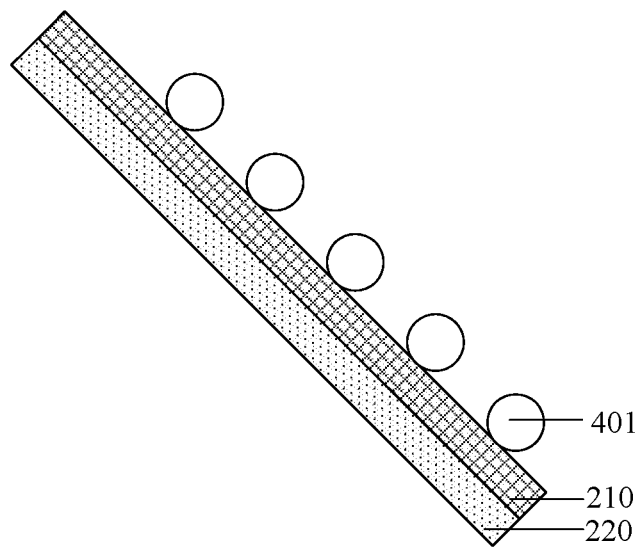
FIG. 4A is a schematic diagram of water droplets adhered on a surface of the conversion film provided by an embodiment of the present disclosure, in which a static water contact angle is in a super-hydrophilic state.
Figure 4B:
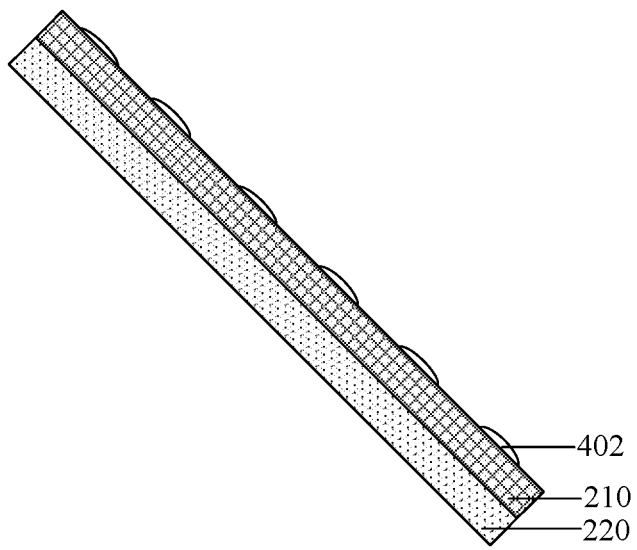
FIG. 4B is a schematic diagram of water droplets adhered on a surface of the conversion film provided by an embodiment of the present disclosure, in which a static water contact angle is in a super-hydrophobic state.

For example, FIG. 4A is a schematic diagram of water droplets adhered on a surface of the conversion film upon the static water contact angle of the conversion film being in a super-hydrophobic state provided by an embodiment of the present disclosure; and FIG. 4B is a schematic diagram of water droplets adhered on a surface of the conversion film upon the static water contact angle of the conversion film being in a super-hydrophilic state provided by an embodiment of the present disclosure. FIG. 4A illustrates shapes of the water droplets 401 adhered on the surface of the conversion film 210 upon the static water contact angle of the conversion film 210 being 165° (being in a super-hydrophilic state), and FIG. 4B illustrates shapes of the water droplets 402 adhered on the surface of the conversion film 210 upon the static water contact angle of the conversion film 210 being 0°. Here, 0° may refer to be close to 0° or standard 0°, and FIG. 4B schematically shows a state in which the static water contact angle is 0°.

With respect to the case where the conversion film 210 being in the super-hydrophilic state, as illustrated by FIG. 4B, upon the conversion film 210 being in the super-hydrophobic state as illustrated by FIG. 4A, the adhesion force of the water droplets adhered on the conversion film 210 is weakened to allow the water droplets on the conversion film 210 easy to roll and accumulate into large water droplets, and then fall from the conversion film 210.

Figure 5:
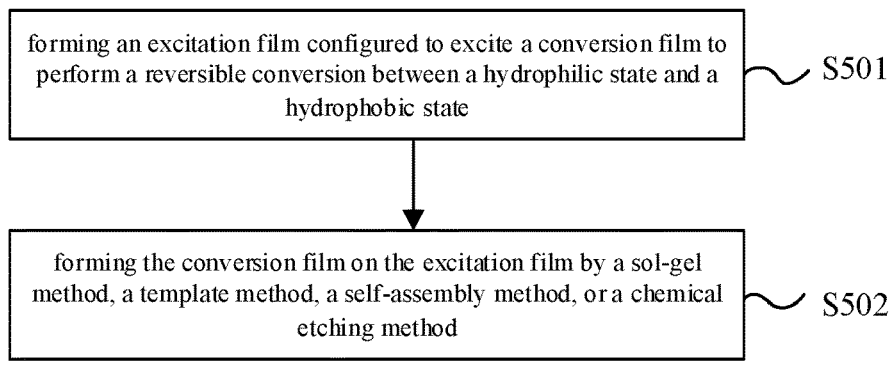
FIG. 5 is a schematic flow diagram of a manufacturing method of an anti-fogging film provided by another embodiment of the present disclosure.

For example, FIG. 5 is a schematic flow chart of a manufacturing method of an anti-fogging film provided by another embodiment of the present disclosure. As illustrated by FIG. 5, another embodiment of the present disclosure provides a manufacturing method of an anti-fogging film, the method includes:

S501: forming an excitation film configured to excite a conversion film to perform a reversible conversion between a hydrophilic state and a hydrophobic state; and S502: forming the conversion film on the excitation film by a sol-gel method, a template method, a self-assembly method, or a chemical etching method.

For example, the present embodiment is described by taking a case where the conversion film is a film which is responsive to temperature as an example, and a surface-initiated atom transfer radical polymerization method can be used to prepare a polymer film which is responsive to temperature on a substrate. The reversible conversion between a super-hydrophilic state and a super-hydrophobic state of the conversion film within a very narrow temperature range can be achieved by controlling the surface roughness.

Figure 6:
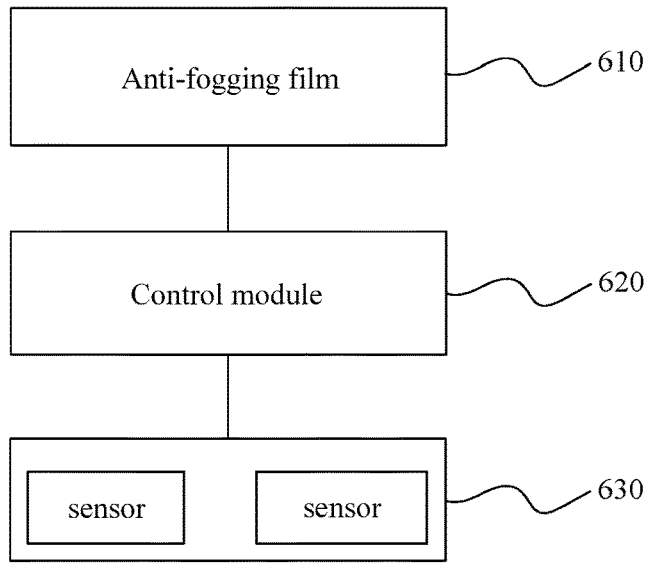
FIG. 6 is a schematic structural diagram of an anti-fogging device provided by another embodiment of the present disclosure.

FIG. 6 is a schematic structural diagram of an anti-fogging device according to another embodiment of the present disclosure. As illustrated by FIG. 6, another embodiment of the present disclosure provides an anti-fogging device, including the anti-fogging film 610 provided by any one of the foregoing embodiments and a control module 620. The anti-fogging film 610 includes: the conversion film 210 and the excitation film 220, as illustrated by FIG. 2A; the control module 620 is configured to adjust the characteristic parameter of the excitation film according to a received message, so as to allow the conversion film to perform the reversible conversion between the hydrophilic and the hydrophobic state.

For example, the control module 620 being configured to adjust the characteristic parameter of the excitation film according to the received message includes: sending the excitation film an electrical signal, such that the characteristic parameter of the excitation film reaches a preset conversion threshold.

For example, after the characteristic parameter of the excitation film reaches the preset conversion threshold, the conversion film is excited to be converted from the hydrophilic state (or super-hydrophilic state) to the hydrophobic state (super-hydrophobic state), or to be converted from the hydrophobic state (a super-hydrophobic state) to the hydrophilic state (or a super-hydrophilic state).

For example, the preset conversion threshold provided in the present embodiment may include at least one selected from the group consisting of a preset temperature conversion threshold, a preset light intensity conversion threshold, a preset pH conversion threshold, and a preset electric field strength conversion threshold.

For example, according to the type of the conversion film, it can be classified into the following cases.

For example, the conversion film is a film which is responsive to temperature, and the control module 620 can send an electrical signal to a heat generation film in the excitation film, such that temperature of a heat transfer film in the excitation film rises. Upon the temperature of the excitation film reaching the preset temperature conversion threshold, the conversion film can be excited to perform the reversible conversion between the hydrophilic state and the hydrophobic state (including the reversible conversion between the super-hydrophilic state and the super-hydrophobic state of the conversion film).

For example, the conversion film is a film which is responsive to light irradiation, and the electrical signal sent to the excitation film will excite light emitting substance in the excitation film to emit light. Upon the light intensity of light emitted by the excitation film is the preset light intensity conversion threshold, the conversion film can be excited to perform the reversible conversion between the hydrophilic state and the hydrophobic state (including the reversible conversion between the super-hydrophilic state and the super-hydrophobic state of the conversion film).

For example, the conversion film is a film which is responsive to pH, and the electrical signal sent to the excitation film will decompose molecular structures in the excitation film, so as to change the pH of the excitation film. Upon the pH of the excitation film reaching the preset pH conversion threshold, the conversion film can be excited to perform the reversible conversion between the hydrophilic state and the hydrophobic state (including the reversible conversion between the super-hydrophilic state and the super-hydrophobic state of the conversion film).

For example, the conversion film is a film which is responsive to electric field, and the electrical signal sent to the excitation film will adjust the electric field strength of the excitation film, so as to form a conversion threshold that satisfies the preset electric field strength conversion threshold, that is, the conversion film can be excited to perform the reversible conversion between the hydrophilic state and the hydrophobic state (including the reversible conversion between the super-hydrophilic state and the super-hydrophobic state of the conversion film).

For example, the anti-fogging film is configured to divide an inside and an outside of an enclosed space, the conversion film may be located on a side of the anti-fogging film facing the inside of the enclosed space, and a side of the excitation film away from the conversion film faces the outside of the enclosed space; or the conversion film may be located on the side of the anti-fogging film facing the outside of the enclosed space, and the side of the excitation film away from the conversion film faces the inside of the enclosed space.

For example, the spaces on two sides of a main plane of the anti-fogging film are respectively the inside and the outside of the enclosed space.

For example, as illustrated by FIG. 6, the anti-fogging device further includes: at least two sensors 630, configured to detect temperatures of the spaces on two sides of the main plane of the anti-fogging film, that is, the internal temperature and the external temperature of the enclosed space. The control module 620 is further configured for: determining a temperature difference detected between the spaces on two sides of the main plane of the anti-fogging film, i.e., a temperature difference between the inside and the outside of the enclosed space; and if the temperature difference reaches a preset fogging threshold, sending the excitation film an electrical signal, such that the characteristic parameter of the excitation film reaches the preset conversion threshold, and the excitation conversion film is excited to convert from the hydrophilic state to the hydrophobic shape.

For example, the preset fogging threshold is 20 degrees, and the embodiment is not limited thereto. For example, the preset fogging threshold may range from 15 degrees to 25 degrees.

For example, an embodiment of the present disclosure also provides a vehicle-mounted device, including the abovementioned anti-fogging device. The vehicle-mounted device is located on a window of a vehicle. For example, the vehicle-mounted device may be located on a side (inside) of the window facing the inside of the vehicle, or on a side (outside) of the window facing the outside of the vehicle.

For example, the enclosed space may be an enclosed space in the vehicle, and the anti-fogging film including the excitation film and the conversion film may be located on an inside of a front windshield of the vehicle, and the conversion film is located on a side of the excitation film facing the inside of the enclosed space. Alternately, the anti-fogging film may be located on an outside of the front windshield of the vehicle, and the conversion film is located on a side of the excitation film away from the inside of the enclosed space. The present embodiment is not limited thereto, and the anti-fogging film may also be two films located on the inside and the outside of the front windshield of the vehicle, respectively. Therefore, the anti-fogging film can prevent fogging inside a window of the vehicle and prevent fogging outside of the window.

For example, the control module is a control module of a central control region of the vehicle, and the sensor is a temperature sensor in the vehicle.

For example, a control module may refer to a software algorithm implementing identification function, for execution by various types of processors.

For example, the control module may also refer to a hardware implementing the identification function, i.e., without considering the costs, a person skilled in the art may construct a corresponding hardware circuit to implement the identification function. For example, the hardware circuit includes a conventional Very Large Scale Integration (VLSI) circuit, a gate array, an existing semiconductor such as a logical chip and a transistor, or other discrete elements. For example, the control module may also be implemented by a programmable hardware device, such as: a field programmable gate array, a programmable array logic, a programmable logic device, etc. The present embodiment is not limited thereto.

For example, the temperature sensor in the vehicle senses an average temperature inside the vehicle and a temperature outside the car, and sends the temperature inside the car and the temperature outside the car to the control module, and the control module subtracts the two temperatures to obtain the temperature difference between the inside and outside of the vehicle. And the temperature difference between the inside and outside of the vehicle is compared to the preset fogging threshold to determine whether the conversion film of the vehicle located on the front windshield fogs or not. If the temperature difference satisfies the preset fogging threshold, an anti-fogging operation can be started, i.e., an electrical signal is sent to the excitation film, such that the characteristic parameter of the excitation film reaches a preset conversion threshold, and the excitation conversion film is excited to convert from the hydrophilic state to the hydrophobic shape, so as to weaken the adhesion force of water droplets adhered on the conversion film to allow the water droplets adhered on the conversion film to be easy to roll and accumulate into large water droplets, and then fall from the conversion film.

Figure 7:
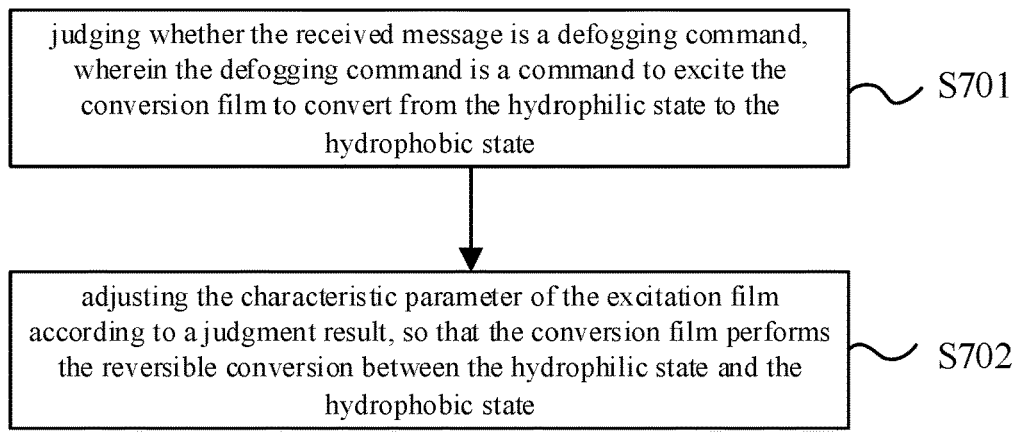
FIG. 7 is a schematic structural diagram of an adjusting method of an anti-fogging device provided by another embodiment of the present disclosure.

As illustrated by FIG. 7, another embodiment of the present disclosure provides an adjusting method of an anti-fogging device, and the method includes:

S701: judging whether the received message is a defogging command, wherein the defogging command is a command to excite the conversion film to convert from the hydrophilic state to the hydrophobic state;

S702: adjusting the characteristic parameter of the excitation film according to a judgment result, so that the conversion film performs the reversible conversion between the hydrophilic state and the hydrophobic state.

For example, the control module is configured to adjust the characteristic parameter of the excitation film according to the received message, including:

If the received message is the defogging command, the excitation film layer is sent with an electrical signal configured to adjust the characteristic parameter of the excitation film to a preset first threshold to excite the conversion film to convert from the hydrophilic state (or a super-hydrophilic state) to the hydrophobic state (or a super-hydrophobic state).

For example, the control module is configured to adjust the characteristic parameter of the excitation film according to the received message, further including:

If the received message is not a defogging command, the excitation film is sent with an electrical signal configured to adjust the characteristic parameter of the excitation film to a preset second threshold.

For example, in a case where the conversion film is in the hydrophilic state, and the received message is the defogging command, according to the received massage, the control module sends the excitation film the electrical signal configured to adjust the characteristic parameter of the excitation film to the preset first threshold to excite the conversion film to convert from the hydrophilic state to the hydrophobic state. Such that the adhesion force of water droplets adhered on the conversion film is weakened to allow the water droplets adhered on the conversion film to be easy to roll and accumulate into large water droplets, and then fall from the conversion film, so as to achieve a defogging effect.

For example, in a case where the conversion film is in the hydrophobic state, and the received message is not the defogging command, according to the received message, the control module sends the excitation film the electrical signal configured to adjust the characteristic parameter of the excitation film to reach the preset second threshold, such that the conversion film is converted from the hydrophobic state to the hydrophilic state, and the window where the conversion film is located is easy to clean and has an anti-dirty effect.

For example, in a case where the conversion film is a film which is responsive to temperature, the preset first threshold is greater than the preset second threshold.

For example, in a case where the conversion film is a film which is responsive to light intensity, the characteristic parameter of the excitation film reaches the preset first threshold to cause the excitation film to emit light, and the characteristic parameter of the excitation film reaches the preset second threshold to enable the excitation film not to emit light.

For example, in a case where the conversion film is a film which is responsive to pH, the characteristic parameter of the excitation film reaches the preset first threshold to make the excitation film acidic, and the characteristic parameter of the excitation film reaches the preset second threshold to make the excitation film alkaline.

For example, in a case where the conversion film is a film which is responsive to the electric field strength, the characteristic parameter of the excitation film reaches the preset first threshold to make the excitation film generate an electric field, and the characteristic parameter of the excitation film reaches the preset second threshold to make the electrical filed in the excitation film disappear.

For example, if the received message is generated by a user, it is judged whether the received message is the defogging command according to a trigger identifier in the received message.

For example, upon the trigger identifier being "1", the received message is the defogging command, that is, the characteristic of the conversion film is controlled to be hydrophobic, so as to achieve an anti-fogging effect; upon the trigger identifier being "0", the received message is a cleaning command, that is, the characteristic of the conversion film is controlled to be hydrophilic, so as to achieve an easy-to-clean effect.

For example, the received message includes: the internal temperature and the external temperature of the enclosed space which are detected; judging whether the received message is the defogging command includes: determining a temperature difference between the spaces on two sides of the main plane of the anti-fogging film according to the temperatures of the spaces on two sides of the main plane of the anti-fogging film in the received message; and if the temperature difference reaches a preset fogging threshold, determining that the received message is the defogging command.

Therefore, the conversion from the hydrophilic state to the hydrophobic state of the conversion film can be achieved by triggering the defogging command. Alternately, whether the hydrophilic state of the conversion film is converted into the hydrophobic state can be determined by calculating the temperature difference between the spaces on two sides of the main plane of the anti-fogging film.

In summary, the embodiments of the present disclosure provide an anti-fogging film, an anti-fogging device, an adjusting method thereof, and a vehicle-mounted device. Upon adjusting the characteristic parameter of the excitation film to reach a preset conversion threshold, a static water contact angle of the conversion film is excited by the excitation film to convert from the hydrophilic state to the hydrophobic state, such that the adhesion force of water droplets on the conversion film is weakened to allow the water droplets on the conversion film easy to roll and accumulate into large water droplets, and then fall from the conversion film, so as to fundamentally ameliorate the fogging problem on the conversion film.

Those skilled in the art should understand that embodiments of the present disclosure can be provided as a method, a system, or a computer program product. Accordingly, the present disclosure may take the form of a complete hardware embodiment, a complete software embodiment, or an embodiment combining hardware and software aspects. Moreover, the present disclosure may take the form of a computer program product implemented on one or more computer-usable storage media (including but not limited to disk storage and optical storage, etc.) including a computer usable program code.

The present disclosure is described with reference to flowcharts and/or block diagrams of methods, device (system), and computer program products according to embodiments of the disclosure, ft should be understood that each flow and/or block of the flowcharts and/or block diagrams, and a combination of the flow and the block in the flowcharts and/or block diagrams can be achieved by computer program commands. These computer program commands can be provided to a processor of a general purpose computer, a special purpose computer, an embedded processor, or other programmable data processing device to produce a machine such that commands executed by a processor of a computer or other programmable data processing devices produce a device configured to implement the functions specified in one or more flows of the flowcharts or one or more blocks of the block diagrams.

These computer program commands can also be stored in a computer readable memory that can direct a computer or other programmable data processing devices to operate in a particular manner, such that the commands stored in the computer readable memory produce a manufacture including a command device, which implements the functions specified in one or more flows of the flowcharts or one or more blocks of the block diagrams.

These computer program commands can also be loaded onto a computer or other programmable data processing devices, such that a series of operational steps are executed on a computer or other programmable devices to produce computer-implemented processing, such that the commands executed on the computer or other programmable data processing devices provide steps configured to implement the functions specified in one or more flows of the flowcharts or one or more blocks of the block diagrams.

The following points should to be explained;

(1) The accompanying drawings involve only the structure(s) in connection with the embodiment(s) of the present disclosure, and other structure(s) can be referred to common design(s).

(2) In the case of no conflict, the features of the embodiments and the embodiments of the present disclosure may be combined with each other to obtain a new embodiment.

The foregoing is only the embodiments of the present disclosure and not intended to limit the scope of protection of the present disclosure, alternations or replacements which can be easily envisaged by any skilled person being familiar with the present technical field shall fall into the protection scope of the present disclosure. Thus, the protection scope of the present disclosure should be based on the protection scope of the claims.

What is claimed is:

1. An anti-fogging device, comprising:
    an anti-fogging film, comprising: a conversion film and an excitation film on the conversion film, wherein the conversion film is configured to perform a reversible conversion between a hydrophilic state and a hydrophobic state according to at least one characteristic parameter of the excitation film; and
    a control module, configured to adjust the at least one characteristic parameter of the excitation film according to a received message, so that the conversion film performs the reversible conversion between the hydrophilic state and the hydrophobic state.

2. The anti-fogging device according to claim 1, wherein the control module being configured to adjust the at least one characteristic parameter of the excitation film according to the received message comprises:
    sending an electrical signal to the excitation film such that the at least one characteristic parameter of the excitation film reaches a preset conversion threshold.

3. The anti-fogging device according to claim 2, further comprising:
    at least two sensors, respectively configured to detect temperatures of spaces on two sides of a main plane of the anti-fogging film, wherein the control module is further configured for:
    determining a detected temperature difference between the spaces on two sides of the main plane of the anti-fogging film; and
    if the temperature difference reaches a preset fogging threshold, sending an electrical signal to the excitation film, so that the at least one characteristic parameter of the excitation film reaches the preset conversion threshold, thereby exciting the conversion film to convert from the hydrophilic state to the hydrophobic state.

4. The vehicle-mounted device according to claim 1, wherein the conversion film has a thickness in a range from 0.1 mm to 1 mm.

5. The vehicle-mounted device according to claim 1, wherein films included in the anti-fogging film are transparent films.

6. The vehicle-mounted device according to claim 1, wherein a side of the conversion film away from the excitation film comprises a groove.

7. A vehicle-mounted device, comprising an anti-fogging device, the anti-fogging device, comprising:
    an anti-fogging film, comprising: a conversion film and an excitation film on the conversion film, wherein the conversion film is configured to perform a reversible conversion between a hydrophilic state and a hydrophobic state according to at least one characteristic parameter of the excitation film; and
    a control module, configured to adjust the at least one characteristic parameter of the excitation film according to a received message, so that the conversion film performs the reversible conversion between the hydrophilic state and the hydrophobic state.

8. The vehicle-mounted device according to claim 7, wherein the at least one characteristic parameter of the excitation film comprises: temperature, pH, light intensity, and electric field strength.

9. The vehicle-mounted device according to claim 8, wherein the excitation film comprises one selected from the group consisting of a film comprising a substance of which pH changes after being energized, a film comprising a substance which emits light after being energized, and a film of which electric field strength changes after being energized.

10. The vehicle-mounted device according to claim 8, wherein the conversion film is a polymer film which is responsive to the at least one characteristic parameter of the excitation film.

11. The vehicle-mounted device according to claim 10, wherein a material of the conversion film is a material which is responsive to the temperature of the excitation film, and the excitation film comprises a heat transfer film.

12. The vehicle-mounted device according to claim 11, wherein the excitation film further comprises: a heat generation film on a side of the heat transfer film away from the conversion film.

13. The vehicle-mounted device according to claim 10, wherein the conversion film is a polymer composite film which is double-responsive to the temperature and the pH of the excitation film.

14. The vehicle-mounted device according to claim 10, wherein the conversion film is a polytetrafluoro wax/fluorinated carbon nanotube composite film, a tin oxide nanorod array film, a film formed by a cellulose nano material, a film comprising a porous conductive polymer, or a composite film having a surface of dimeric pyrrole.

* * * * *